May 23, 1967 T. KOUZUKI 3,321,040
CHAIN SPROCKET CHANGING MEANS FOR MOTORCYCLES
Filed Oct. 6, 1965 2 Sheets-Sheet 1

INVENTOR.
TADAO KOUZUKI
BY
Buckman and Archer
ATTORNEYS

May 23, 1967  T. KOUZUKI  3,321,040
CHAIN SPROCKET CHANGING MEANS FOR MOTORCYCLES
Filed Oct. 6, 1965  2 Sheets-Sheet 2

INVENTOR.
TADAO KOUZUKI
BY
Buckman and Archer
ATTORNEYS

3,321,040
CHAIN SPROCKET CHANGING MEANS FOR MOTORCYCLES
Tadao Kouzuki, Kobe-shi, Hyogo-ken, Japan
Filed Oct. 6, 1965, Ser. No. 493,367
Claims priority, application Japan, June 8, 1965, 40/45,670
7 Claims. (Cl. 180—33)

The present invention relates to a chain drive means for a motorcycle, and more particularly to a chain sprocket changing means therefor.

It is already known, in a motorcycle having a chain drive means, to replace the chain sprocket with another sprocket of desired diameter in accordance with load condition to obtain desired speed ratio. However, in the prior motorcycle of this type, it was necessary to remove the rear wheel assembly and replace the sprocket secured therein with another sprocket of different diameter when desired, and the removed sprocket must be carried on the motorcycle. Further, such a motorcycle which has two or more sprocket wheels assembled on the drive wheel hub is also known. However, this type also has inconveniences that the larger sprocket must be moved by hand after removing the bolts and nuts and thereafter must be fixed in the place by means of the bolts and the nuts.

Accordingly, the present invention intends to overcome these difficulties and has an object to provide a simple and reliable sprocket changing means for a motorcycle by which a sprocket can be easily and quickly replaced with another sprocket of desired diameter.

Another object of the present invention is to provide a means comprising a larger and a smaller sprocket wheel mounted on a shaft, the larger one being movable transversely relative to the smaller one only by rotating the bolts so as to effect sprocket replacement.

In order that the invention may be understood, it will now be described with reference to the accompanying drawings in which.

Figure 1:
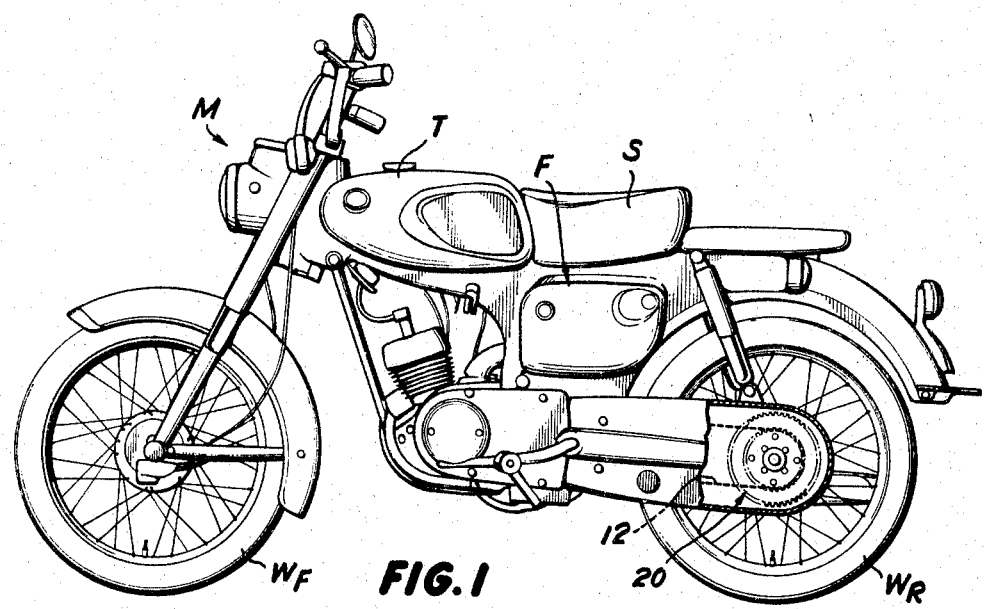
FIG. 1 is a partially broken side elevation of a motorcycle embodying the present invention.
Figure 2:
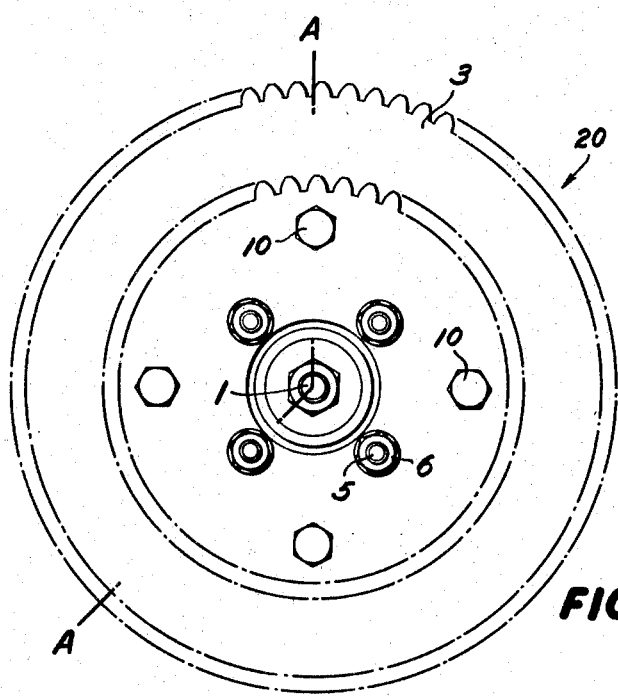
FIG. 2 is a side elevation of a sprocket wheel assembly in accordance with the present invention.

Referring now to the drawings, particularly to FIG. 1, a motorcycle M comprises a frame assembly F carrying a seat S and a fuel tank T, a front and a rear wheel assembly $W_F$ and $W_R$ supporting the frame assembly, and an engine and transmission assembly E mounted on the frame assembly F. A sprocket assembly 20, which is constructed in accordance with the present invention as will be described later in detail, is mounted on the wheel hub of the rear wheel assembly $W_R$ and is drivingly connected with the drive shaft of the engine assembly E through a chain 12. Thus, the driving power is transmitted from the engine assembly E through the chain 12 and the sprocket assembly 20 to the rear wheel assembly $W_R$. The general construction of the motorcycle is well known in the art, so that it will not be described more in detail.

Referring to FIGS. 2 through 5, the numeral 1 shows the rear wheel shaft of a motorcycle on which a hub 2 and a sprocket assembly 20 comprising a larger and a smaller sprocket wheel 3 and 4 are rotatably mounted.

The smaller sprocket wheel 4 is secured to the hub 2 by means of bolts 5, nuts 6 and washers 7, and rotates with the hub 2. The smaller sprocket 4 is fixed on the end of the hub 2, and the larger sprocket 3 is axially slidably disposed at the side of the sprocket 4. The larger sprocket 3 is dish-shaped and has a circular recess of such a diameter that can accommodate the smaller sprocket 4 therein at the center portion of its outer surface. The depth of the recess is substantially same as the thickness of the smaller sprocket 4 so that the plane of teeth of the larger sprocket 3 coincides with that of the smaller sprocket 4 when the large sprocket 3 is moved axially toward the smaller sprocket 4 until both sprockets come in contact with each other.

Figure 3:
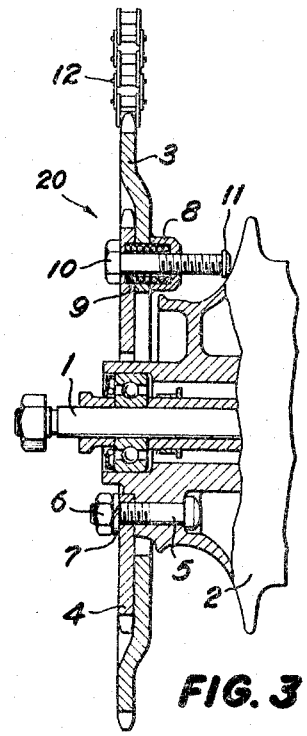
FIG. 3 is a cross-sectional view taken along the line A—A of FIG. 2.
Figure 4:
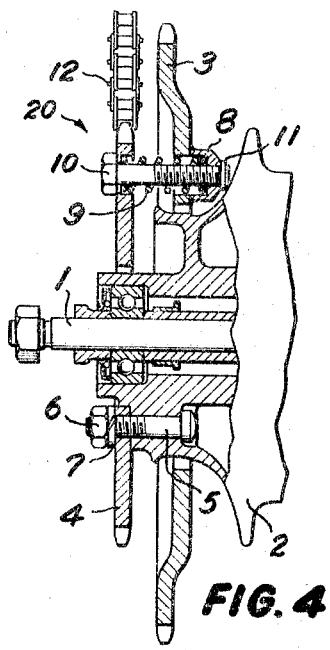
FIG. 4 is a cross-sectional view similar to FIG. 3 but the larger sprocket wheel is displaced and the chain is engaged with the smaller sprocket wheel.
Figure 5A:
FIG. 5(a) and (b) are partially enlarged sectional views respectively showing the larger and the smaller sprocket wheels in operative position.
Figure 5B:
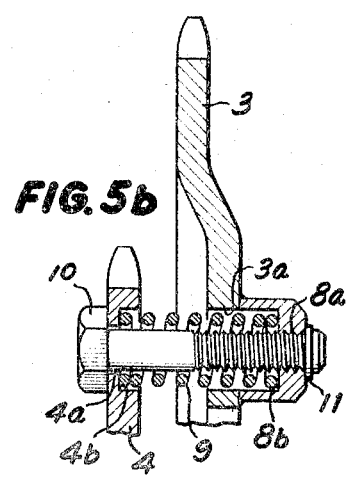

The connection between the sprockets 3 and 4 is clearly shown in FIGS. 3 and 4. As illustrated, the smaller sprocket 4 is formed with bolt holes 4a at the proper positions and also the larger sprocket 3 is formed with the holes 3a aligned with said holes 4a. Each hole 3a is larger in diameter than the hole 4a and the larger sprocket 3 has cup-shaped nuts 8 secured on its inboard surface in such positions that each nut 8 encircles any one of said holes 3a by any suitable means such as welding. Each nut 8 has a threaded hole 8a concentric with the bolt hole 4a and a bolt 10 is threadably inserted through the hole 3a into the hole 8a. The bolt 8a is provided with a stopper such as a stop ring 11 to prevent its removal off the hole 8a. The smaller sprocket 4 has spring seats 4b around the bolt holes 4a and compression coil springs 9 are interposed between the seats 4b and the spring seats 8b defined by the inner surfaces of the bottoms of the nuts 8. The assembling procedures of the sprockets 3 and 4 and their related parts are self-evident and will not be described in detail.

FIG. 4a shows the larger sprocket 3 in operative position. In this position, the larger sprocket 3 is moved to the extreme left position where its teeth plane coincides with that of the smaller sprocket 4, and thus the chain 12 engages with the larger sprocket 3.

When it is desired to use the smaller sprocket 4, the bolts 10 are rotated in such directions that the nuts 8 are moved right or toward the center line of the motorcycle along the threaded portion of the bolt 10. Thus, the teeth plane of the larger sprocket 3 is displaced from the operative position and the teeth of the sprocket 4 is exposed. Then the chain 12 is reduced in length so as to accommodate the change of sprocket radius by cutting the chain 12, removing proper number of chain links and reconnecting it into the original loop as well known to those skilled in the art, and after that, the chain is placed around the sprocket 4.

According to the present invention, the springs 9 are interposed between the sprockets 3 and 4 so as to urge the sprocket 3 to keep apart from the sprocket 4, so that, when the sprocket 4 is in use, the sprocket 3 is effectively prevented from approaching to the sprocket 4 and thus the adverse result of interference between the sprocket 3 and the chain 12 is positively avoided.

When it is desired to use the large sprocket 3, the chain 12 is removed from the sprocket 4, the bolts are rotated in such directions that the sprocket 3 approaches to the sprocket 4 until the sprockets contact with each other and both teeth planes coincide, and thereafter the chain 12, which is increased in length by adding a suitable number of chain links so as to accommodate the change of sprocket radius, is placed around the sprocket 3. Thus, the motorcycle becomes to be driven through the larger sprocket 3.

As apparent from the above description, the present invention provides a means which enables quick and positive sprocket change in a chain drive means for a motorcycle.

The details of the structure may be modified substan-

What is claimed is:

1. A sprocket changing means for a chain drive means in a motorcycle comprising a first sprocket fixed on the wheel hub, an axially movable second sprocket having diameter different from that of said first sprocket and disposed in parallel relation to the first sprocket, said second sprocket having such a shape that its teeth plane coincides with that of the first sprocket when it is in contact with said first sprocket, said first and second sprockets are interconnected by means of a plurality of bolts threadably inserted through the bolt holes formed in one of said sprockets into the threaded holes formed in the other of said sprockets, and a resilient means interposed between the first and the second sprocket so as to urge them to get apart from each other, whereby the axial movement of said second sprocket is effected by rotating said bolt.

2. A sprocket changing means as defined by claim 1 wherein said second sprocket is larger in diameter than the first sprocket.

3. A sprocket changing means as defined by claim 2 wherein said second sprocket is dish-shaped and has a circular recess of such a diameter that can accommodate the first sprocket therein at the center portion of its surface, the depth of said recess being substantially same as the thickness of the first sprocket so that the teeth plane of the second sprocket coincides with that of the first sprocket when the second sprocket is moved axially toward the first sprocket until both sprockets come in contact with each other.

4. A sprocket changing means as defined by claim 1 wherein said first sprocket is provided with said bolt holes and said second sprocket is provided with said threaded holes.

5. A sprocket changing means as defined by claim 4 wherein said second sprocket has a plurality of holes larger in diameter than and corresponding to said bolt holes formed in said first sprocket, a plurality of cup-shaped nuts are secured on the surface of the second sprocket remote from said first sprocket in such positions that each nut encircles any one of said holes to provide said threaded holes, and said resilient means comprises a plurality of coil springs each which is disposed between any one of the spring seats provided around one of said bolt holes and the bottom surface of one of said cup-shaped nuts.

6. A motorcycle comprising a frame assembly carrying a seat and a fuel tank, a front and a rear wheel assembly supporting said frame assembly, an engine and transmission assembly mounted on said frame assembly, and a sprocket assembly mounted on said rear wheel assembly and drivingly connected with the engine assembly through a chain, said sprocket assembly including a first sprocket fixed on the wheel hub, an axially movable second sprocket having diameter different from that of said first sprocket and disposed in parallel relation to the first sprocket, said second sprocket having such a shape that its teeth plane coincides with that of the first sprocket when it is in contact with said first sprocket, said first and second sprockets are interconnected by means of a plurality of bolts threadably inserted through the bolt holes formed in one of said sprockets into the threaded holes formed in the other of said sprocket, and a resilient means interposed between the first and the second sprocket so as to urge them to get apart from each other, whereby the axial movement of said second sprocket is effected by rotating said bolt.

7. A motorcycle in accordance with claim 6 wherein said second sprocket has a plurality of holes larger in diameter than and corresponding to said bolt holes formed in said first sprocket, a plurality of cup-shaped nuts are secured on the surface of the second sprocket remote from said first sprocket in such positions that each nut encircles any one of said holes to provide said threaded holes, and said resilient means comprises a plurality of coil springs each of which is disposed between any one of the spring seats provided around one of said bolt holes and the bottom surface of one of said cup-shaped nuts.

References Cited by the Examiner

UNITED STATES PATENTS

| | | | |
|---|---|---|---|
| 601,990 | 5/1898 | Suter | 74—244 |
| 1,244,383 | 10/1917 | Snider | 74—244 |
| 2,199,331 | 5/1940 | Carlsson | 74—244 |
| 3,165,002 | 1/1965 | Hatch | 74—244 X |
| 3,187,597 | 6/1965 | Gwin | 74—244 |

KENNETH H. BETTS, *Primary Examiner.*